(12) United States Patent
Giltner

(10) Patent No.: US 11,103,943 B2
(45) Date of Patent: Aug. 31, 2021

(54) BLADE EXTENSION AND EXTENDED REACH RECIPROCATING SAW WITH BLADE EXTENSION

(71) Applicant: Randy Giltner, Imnaha, OR (US)

(72) Inventor: Randy Giltner, Imnaha, OR (US)

( * ) Notice: Subject to any disclaimer, the term of this patent is extended or adjusted under 35 U.S.C. 154(b) by 91 days.

(21) Appl. No.: 15/890,236

(22) Filed: Feb. 6, 2018

(65) Prior Publication Data

US 2019/0240748 A1     Aug. 8, 2019

(51) Int. Cl.
| | |
|---|---|
| *B23D 49/10* | (2006.01) |
| *B23D 51/10* | (2006.01) |
| *B23D 61/12* | (2006.01) |
| *B23D 49/11* | (2006.01) |
| *B23D 51/02* | (2006.01) |

(52) U.S. Cl.
CPC .......... *B23D 51/10* (2013.01); *B23D 49/105* (2013.01); *B23D 49/11* (2013.01); *B23D 51/02* (2013.01); *B23D 61/123* (2013.01)

(58) Field of Classification Search
CPC .... B23D 51/10; B23D 49/105; B23D 61/123; A01G 3/08; B27B 19/09
See application file for complete search history.

(56) References Cited

U.S. PATENT DOCUMENTS

| | | | |
|---|---|---|---|
| 2,881,519 A | 4/1959 | Gardner | |
| 3,155,011 A | 11/1964 | Hyskell | |
| 3,373,779 A | * 3/1968 | Taft | ...................... B23D 49/162 |
| | | | 30/394 |
| 4,235,017 A | * 11/1980 | Yavis | ................... B23D 49/167 |
| | | | 227/156 |
| 4,790,045 A | * 12/1988 | Doherty | .................. A47L 13/08 |
| | | | 15/236.01 |
| 5,185,934 A | 2/1993 | Tillman | |
| 5,421,091 A | * 6/1995 | Gerritsen, Jr. | ....... B23D 49/167 |
| | | | 30/377 |
| 8,191,268 B2 | 6/2012 | Willetts | |
| 8,919,787 B1 | 12/2014 | Wilcher | |

(Continued)

OTHER PUBLICATIONS

Amazon, "Paws Off Tools BBM-18 18-Inch Medium Extend-A-Blade—Reciprocating Saw Blades," https://www.amazon.com/paws-off-tools-bbm-18-extend-a-blade/dp/b0027vsdf4 (downloaded Oct. 28, 2017).

(Continued)

*Primary Examiner* — Kenneth E Peterson
*Assistant Examiner* — Liang Dong
(74) *Attorney, Agent, or Firm* — Klarquist Sparkman, LLP

(57) ABSTRACT

A blade extension for a reciprocating saw comprises a movable member and a stationary member. The movable member has a proximal end, a distal end and a body extending between the proximal end and the distal end. The proximal end comprises a blade end shaped to be received in a blade holder of the reciprocating saw. The distal end is configured to be coupled to a reciprocating saw blade. The stationary member extends along at least a portion of the movable member and supports the movable member for movement relative to the stationary member. The stationary member has a proximal end configured to be coupled to the reciprocating saw and an opposite distal end. The distal end of the movable member is arranged to protrude distally beyond the distal end of the stationary member.

12 Claims, 2 Drawing Sheets

(56) References Cited

U.S. PATENT DOCUMENTS 9,421,625 B2 * 8/2016 Selby ................... B23D 49/167
10,188,044 B1 * 1/2019 Blackburn, Jr. ....... A01G 3/085

OTHER PUBLICATIONS

Extreme How To, "Cordless Reciprocating Saw—Handy for Yard Work," https://extremehowto.com/cordless-reciprocating-saws---handy-for-yard-work (downloaded Oct. 28, 2017).
Home Depot, "ECHO PAS Power Pruner Attachment," https:/www.homedepot.com/p/ECHO-PAS-Power-Pruner-Attachment-99944200532/100675483?keyword=ECHO+PAS+Power+Pruner+Attachment (downloaded Oct. 28, 2017).
Industrial News, "Reciprocating Saw Blade Extension increases reach by 22 in.," https://news.thomasnet.com/fullstory/reciprocating-saw-blade-extension-increases-reach-by-22-in-458883 (downloaded Oct. 28, 2017).

* cited by examiner

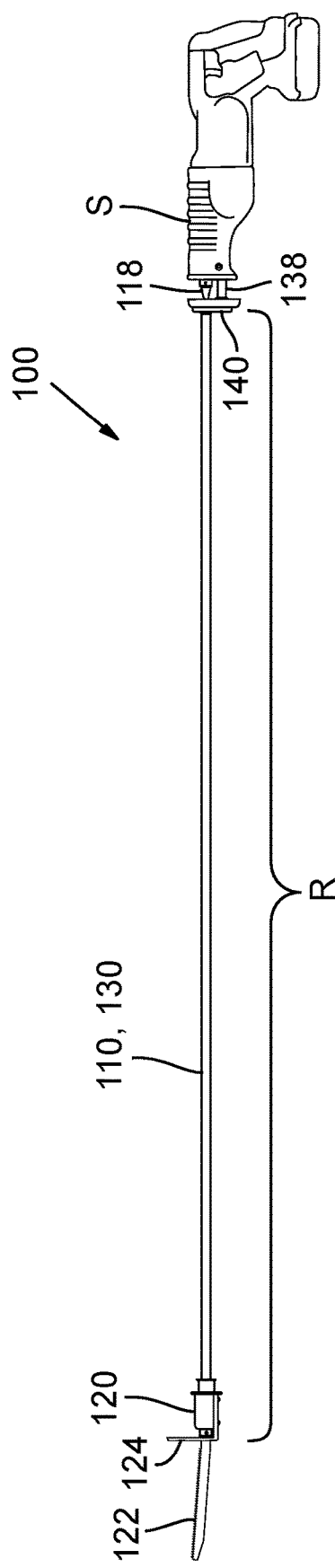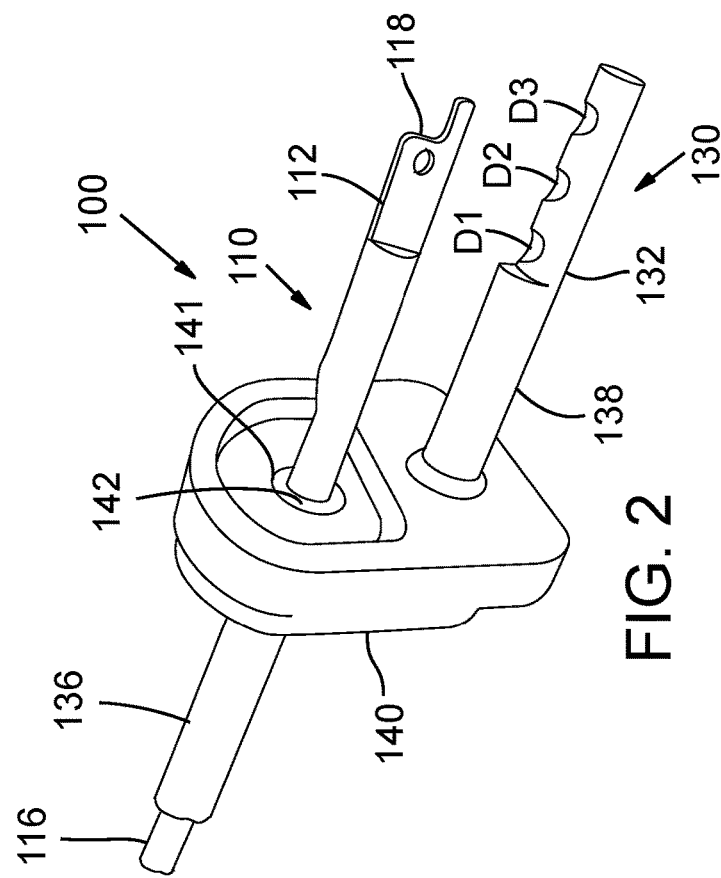

BLADE EXTENSION AND EXTENDED REACH RECIPROCATING SAW WITH BLADE EXTENSION

BACKGROUND

Reciprocating saws and other similar cutting tools, whether corded or cordless, have a useful reach restricted by the length of the longest blade or cutting accessory available for the particular tool. Some extended length reciprocating saw blades are available, but they still offer only a limited reach. Users seeking to cut a workpiece at a location beyond the reach of the specific saw and blade combination must reposition themselves, e.g., by using a ladder or moving closer to the cutting location.

In some cases, however, requiring a user to change his or her position poses an inconvenience or a risk of injury. Many injuries are associated with the use of ladders. Similarly, moving to a position to allow use of the saw within the limited reach currently available may place the user within harm's way, such as in demolition operations.

Conventional blades do not provide for an extended length of a sufficient extent or account for the need to restrain the blade from flexing beyond an acceptable degree.

SUMMARY

Described below are implementations of a blade extension for a reciprocating saw or other cutting tool, and an extended reach reciprocating saw with a blade extension, that address some the drawbacks conventional saws and saw blades.

In one implementation, a blade extension for a reciprocating saw comprises a movable member and a stationary member. The movable member has a proximal end, a distal end and a body extending between the proximal end and the distal end. The proximal end comprises a blade end shaped to be received in a blade holder of the reciprocating saw. The distal end is configured to be coupled to a reciprocating saw blade. The stationary member extends along at least a portion of the movable member and supports the movable member for movement relative to the stationary member. The stationary member has a proximal end configured to be coupled to the reciprocating saw and an opposite distal end. The distal end of the movable member is arranged to protrude distally beyond the distal end of the stationary member.

In one implementation, a reciprocating saw comprises a reciprocating saw body having a distal end with a first blade holder, a blade extension having a proximal end with a blade end shaped to be received in the first blade holder, and a distal end with a second blade holder shaped to receive a reciprocating saw blade and extended length between the proximal end and the distal end. The blade extension comprises a support coupled to reciprocating saw and extending distally to support the extended length and allow the reciprocating saw's reciprocating action to be transmitted to the distal end.

The foregoing and other features and advantages will become more apparent from the following detailed description, which proceeds with reference to the accompanying figures.

BRIEF DESCRIPTION OF THE DRAWINGS

FIG. 1 is a side elevation view showing a blade extension of one implementation coupled to a saw, such as a reciprocating saw, to provide an extended reach while using the saw.

FIG. 2 is a perspective view of a portion of the blade extension showing proximal ends of a movable member and a stationary member.

DETAILED DESCRIPTION

Figure 3:
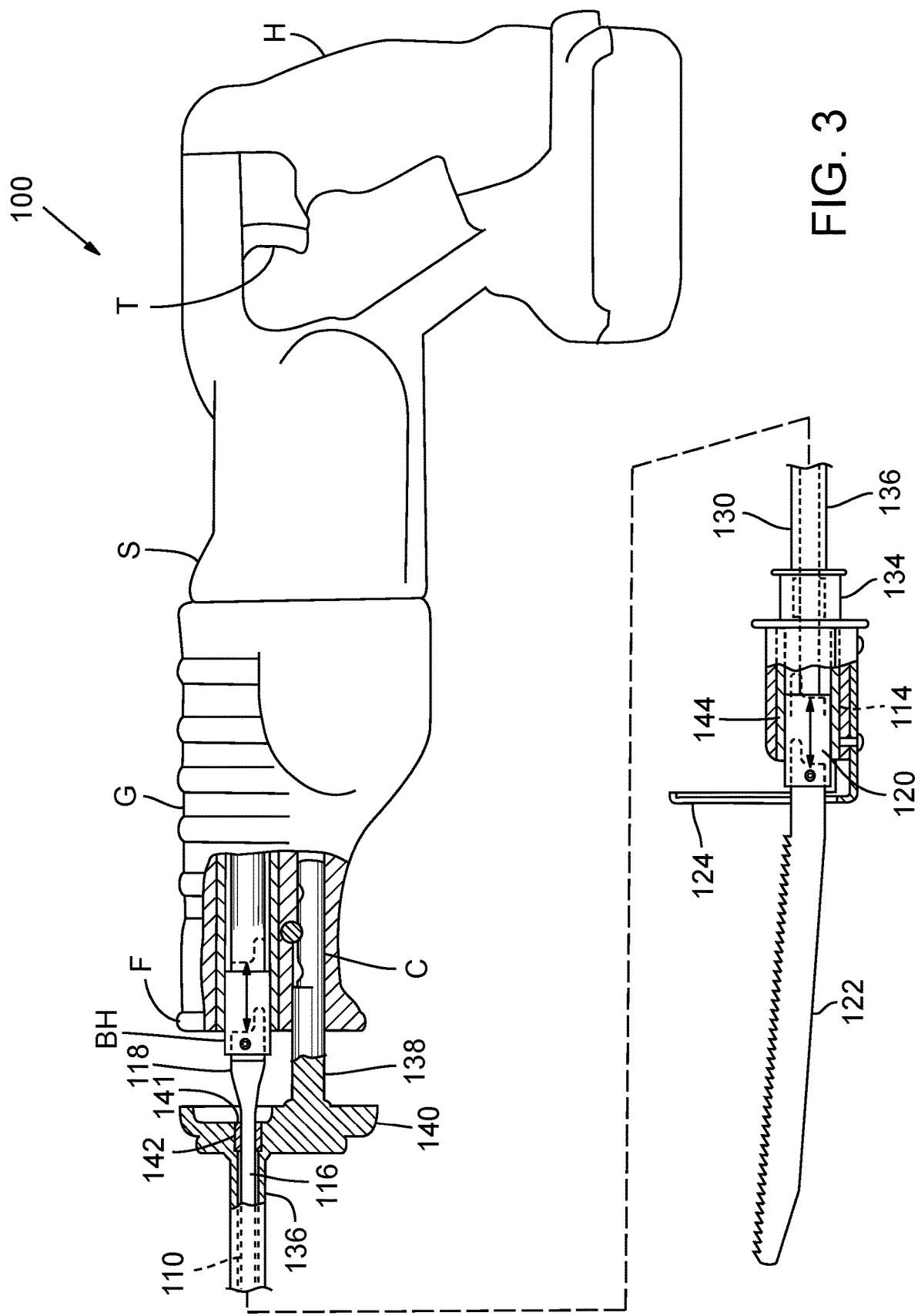
FIG. 3 is a partially sectioned side elevation view of the blade extension showing its proximal end being coupled to a saw and a saw blade being coupled to its distal end.

Described below are implementations of a blade extension for a reciprocating saw or other cutting tool, and an extended reach reciprocating saw with a blade extension. Reciprocating saws of the type commonly used in construction and demolition work are widely available today in both corded and cordless configurations. A reciprocating saw is sometimes familiarly referred to as a "sawzall" (SAWZALL is a registered trademark of the Milwaukee Electric Tool Company), a "hognose," or a "recip saw," among others. During operation of a reciprocating saw, the saw's blade reciprocates or moves back and forth. Jig saws, scroll saws and sabre saws (typically designed for one-handed use) are sometimes grouped together with reciprocating saws (typically designed for two-handed use) because they also have blades that are powered to cut with a back and forth motion.

Referring to FIG. 1, a blade extension 100 for a saw S, such as a reciprocating saw, includes a movable member 110 capable of extending the saw's blade motion over an extended reach R and a stationary member 130 that supports the movable member 110. With the blade extension 100 installed as shown, a user can use the extended reach R provided to engage a blade 122 at a distal end 114 of the movable member 110 with an object located at a distance from the user. The extended reach R may be several times the length of the saw's body, or several times the length of conventional blades (even extended length blades), and thus may have lengths greater than 18 inches, such as 20 inches, 24 inches, 36 inches, 48 inches, etc.

FIG. 2 is a perspective view of a portion of the blade extension 100, which has been moved from the saw S for ease of illustration. The movable member 110 has a proximal end 112 that is configured for coupling to the saw S. For example, the proximal end 110 may be configured to have a saw blade end 118 as shown, which is similar to the end of a conventional saw blade. With the saw blade end 118, the movable member 112 can be easily coupled to a conventional blade holder BH (FIG. 3) of the saw S.

The stationary member 130 has a proximal end 132 that is coupled to the saw S and an opposite distal end 134. Thus, in addition to the connection or coupling between the movable member 112 and the saw 5, there is a second connection or coupling between the stationary member 130 and the saw S.

The stationary member 130 also has a body 136 shaped to support the movable member 112. The stationary member is sometimes referred to herein as a "support." The body 136 can have a base, such as a base 140 as shown in FIG. 2. In one implementation, the body 136 is shaped as a tube, and the base 140 has an opening 141 aligned with the tube, such that the movable member 112 can be received in and extend through the body 136 and base 140.

Referring again to FIG. 2, the proximal end 132 of the stationary member 130 in one implementation includes a mounting piece 138 extending approximately parallel to and offset from the movable member 110. The mounting piece 138 is shaped for coupling with the saw S. In one implementation, the mounting piece 138 extends from the base 140 and is shaped for insertion into a cavity on the saw S designed to receive an adjustable shoe (also sometimes referred to as a foot) (not shown). With the shoe removed, the mounting piece 138 can be inserted in place of the shoe. Optionally, the mounting piece 138 can include multiple cutouts, such as D1, D2, D3, etc., to allow the base 140 to be spaced at a desired distance from the end of the saw S.

Referring to FIG. 3, a sectioned side elevation view of proximal and distal portions of the blade extension 100 is shown during assembly with the saw S. Specifically, the saw blade end 118 of the movable member 118 is shown prior to being inserted into a blade holder 1314 at a forward end F of the saw S. The mounting piece 138 of the stationary member 130 is shown inserted into a cavity C for the shoe and fixed in position relative to the forward end F.

Within the body 136 of the stationary member 130, there is at least a first bushing or spacer 142 shaped to guide the movable member 110 in its reciprocating or other motion relative to the stationary member 130. There may be at least a second bushing or spacer 144 as shown located near the distal end of the stationary member 130. The stationary member 130 has a length determined to allow the movable member 110 to move as desired, such as in a reciprocating motion, relative to the stationary member 130.

In FIG. 3, the blade 122 is shown being installed or removed from the blade holder 120 positioned at the distal end of the stationary member 130. The blade holder 120 may be similar to the blade holder BH used on a conventional saw, or it may be of a different design. For example, the blade holder 120 may have a rotatable portion that allows for tool free installation and removal of conventional saw blades. An optional blade support or shoe 124 may be provided at the distal end of the stationary member 130.

In use, a user holds the saw S by the handle H with one hand and actuates the trigger T to cause the blade to move while typically holding the body of the saw S, such as in the region of the grip G, with the other hand. Operation of the saw S with the blade extension 100 installed is similar, thus providing the user with the extended reach R without requiring the user to change from hand positions on the handle H and on the grip G.

The blade extension 100 is designed to be relatively rigid and non-flexing over an operating range of applied three that a user would need to exert in typical cutting operations, e.g., in trimming overhead limbs. Thus, the blade extension 100 is sufficiently non-flexing to permit the user to accurately guide the blade 122 to a selecting cutting location on the workpiece and to transmit a slight force in the direction of cutting as applied by the opposing motions of the user's hands on the saw 5, without requiring any force to be manually applied on blade extension itself. At the same time, the blade extension 100 need not be absolutely rigid and can flex to some degree while still serving the functions of safely and accurately extending the reach of the saw. If provided with a shoe 124, the blade extension 100 is also sufficiently non-flexing to allow the shoe 124 to be urged into engagement with the work piece to help the user maintain the blade in the desired cutting location during operation of the saw S. As one example, a 72-inch blade extension according to one implementation is sufficiently rigid, but is capable of resiliently flexing about 2.625 inches in response to an application 11.2 pounds of force at the distal end of blade.

In the implementation described above, the stationary member 130 is tubular, which protects against unintended contact of the movable member 110 with objects during use. It would also be possible, however, for the stationary member to have a cross section that partially surrounds the movable member 110 and sufficiently guards against unintended contact and is suitably non-flexing while keeping the weight of the blade extension 100 sufficiently low to prevent user fatigue during use.

For purposes of disclosure, certain aspects, advantages, and novel features of the implementations are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Features, integers or characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosed technology is not restricted to the details of any foregoing embodiments. The disclosed technology extends to any novel one, or any novel combination, of the features disclosed in this specification (including any accompanying claims, abstract and drawings), or to any novel one, or any novel combination, of the steps of any method or process so disclosed.

Although the operations of some of the disclosed methods are described in a particular, sequential order for convenient presentation, it should be understood that this manlier of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. As used herein, the terms "a", "an", and "at least one" encompass one or more of the specified element. That is, if two of a particular element are present, one of these elements is also present and thus "an" element is present. The terms "a plurality of," "plural" and "multiple" mean two or more of the specified element.

In the description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

In some examples, values, procedures, or apparatus are referred to as "lowest," "best," "minimum," or the like. It will be appreciated that such descriptions are intended to indicate that a selection among many used functional alternatives can be made, and such selections need not be better, smaller, or otherwise preferable to other selections.

As used herein, the term "and/or" used between the last two of a list of elements means any one or more of the listed elements. For example, the phrase "A, B, and/or C" means "A," "13," "C," "A and B," "A and C," "13 and C," or "A, 13, and C."

As used herein, the term "coupled" generally means physically coupled or linked and does not exclude the presence of intermediate elements between the coupled items absent specific contrary language.

Unless otherwise indicated, all numbers expressing quantities of components, molecular weights, percentages, temperatures, pressures, flow rates, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximates unless the word "about" is recited. Furthermore, not all alternatives recited herein are equivalents.

In view of the many possible embodiments to which the principles of the disclosed technology may be applied, it should be recognized that the illustrated embodiments are only preferred examples and should not be taken as limiting the scope of the disclosure. Rather, the scope of the disclosure is at least as broad as the following claims.

What is claimed is:

1. A blade extension for a reciprocating saw, comprising:
   a movable member having a proximal end, a distal end and a body extending between the proximal end and the distal end, wherein the proximal end comprises a blade end shaped to be received in a blade holder of the reciprocating saw, and wherein the distal end is configured to be coupled to a reciprocating saw blade; and
   a stationary member having a self-supporting tubular body and a base attached to a proximal end of the self-supporting tubular body, wherein the movable member is received in the self-supporting tubular body with the distal end of the movable member configured to protrude beyond a distal end of the self-supporting tubular body,
   wherein the movable member and the self-supporting tubular body provide an extended reach of at least 18 inches for the reciprocating saw, and the self-supporting tubular body extends over a majority of the extended reach,
   wherein the self-supporting tubular body and the base support the movable member for reciprocating sawing motion relative to the stationary member in two-handed operation of the reciprocating saw,
   wherein the base has a proximal side with a recessed area and a through opening defined within the recessed area, wherein the through opening is aligned with the self-supporting tubular body and the proximal end of the movable member extends beyond the through opening, the base having a mounting piece extending proximally parallel to the movable member and laterally spaced apart, from the recessed area, the mounting piece defining a proximal end of the stationary member and a mounting axis with multiple axially-spaced recesses formed on the mounting piece, wherein the mounting piece can be axially positioned such that a selected one of the recesses is coupled within a shoe-receiving cavity of the reciprocating saw at a selected axial spacing between the base and the shoe-receiving cavity.

2. The blade extension of claim 1, wherein the distal end of the movable member comprises a blade holder for holding a blade for the reciprocating saw.

3. The blade extension of claim 1, wherein the blade extension is dimensioned to provide an extended reach of the reciprocating saw by at least 24 inches.

4. The blade extension of claim 1, wherein the blade extension is dimensioned to provide an extended reach of the reciprocating saw by at least 36 inches.

5. The blade extension of claim 1, wherein the blade extension is dimensioned to provide an extended reach of the reciprocating saw by 72 inches.

6. The blade extension of claim 1, wherein the distal end of the self-supporting body comprises a blade support configured for positioning against an object to stabilize the reciprocating saw and blade extension during a cutting operation.

7. The reciprocating saw of claim 1, wherein the opening in the base of the stationary member is fitted with a spacer that contacts and guides the movable member when the movable member reciprocates within the self-supporting tubular body.

8. A reciprocating saw, comprising:
   a reciprocating saw body having a distal end with a first blade holder and a shoe receiving cavity;
   a blade extension having a proximal end with a blade end shaped to be received in the first blade holder, a distal end with a second blade holder shaped to receive a reciprocating saw blade and provide an extended reach of at least 18 inches between the proximal end and the distal end;
   the blade extension having an inner movable member and an outer self-supporting tubular body, the inner movable member being movable in a reciprocating motion relative to the outer self-supporting tubular body when the reciprocating saw is in operation; and
   the blade extension comprising a base, wherein the base has a proximal side with a recessed area and a through opening defined within the recessed area, wherein the through opening is aligned with the self-supporting tubular body and the proximal end of the movable member extends beyond the through opening, the base having a mounting piece extending proximally parallel to the movable member and laterally spaced apart from the recessed area, the mounting piece defining a proximal end of the stationary member and a mounting axis with multiple axially-spaced recesses formed on the mounting piece, wherein the mounting piece can be axially positioned such that a selected one of the recesses is coupled within a shoe-receiving cavity of the reciprocating saw at a selected axial spacing between the base and the shoe-receiving cavity.

9. The reciprocating saw of claim 8, wherein the extended reach provided by the blade extension is at least 24 inches.

10. The reciprocating saw of claim 8, wherein the blade extension has a length of 72 inches and is sufficiently rigid to deflect no more than 3 inches in response to a force of 10 pounds applied to the distal end.

11. The reciprocating saw of claim 8, wherein the extended reach provided by the blade extension is at least 36 inches.

12. The reciprocating saw of claim 8, wherein the extended reach provided by the blade extension is at least 72 inches.

* * * * *